United States Patent
Zhang et al.

(10) Patent No.: US 9,779,054 B2
(45) Date of Patent: Oct. 3, 2017

(54) SYSTEM, APPARATUS AND METHOD FOR CENTRALIZED MANAGEMENT OF SECURITY INSPECTION DEVICES VIA FIELD BUS NETWORK

(71) Applicant: Nuctech Company Limited, Beijing (CN)

(72) Inventors: Jinyu Zhang, Beijing (CN); Hui Ding, Beijing (CN); Hu Tang, Beijing (CN); Fei Fang, Beijing (CN)

(73) Assignee: Nuctech Company Limited, Beijing (CN)

( * ) Notice: Subject to any disclaimer, the term of this patent is extended or adjusted under 35 U.S.C. 154(b) by 338 days.

(21) Appl. No.: 14/579,443

(22) Filed: Dec. 22, 2014

(65) Prior Publication Data
US 2015/0186326 A1 Jul. 2, 2015

(30) Foreign Application Priority Data
Dec. 26, 2013 (CN) .......................... 2013 1 0739125

(51) Int. Cl.
*G06F 13/42* (2006.01)
*G06F 13/38* (2006.01)
(Continued)

(52) U.S. Cl.
CPC ......... *G06F 13/4208* (2013.01); *G05B 15/02* (2013.01); *G05B 19/042* (2013.01);
(Continued)

(58) Field of Classification Search
USPC ................. 713/300–340; 710/104–105, 110
See application file for complete search history.

(56) References Cited

U.S. PATENT DOCUMENTS 4,747,041 A * 5/1988 Engel .................... G06F 1/3203
307/29
5,742,514 A * 4/1998 Bonola .................... G06F 1/26
379/258
(Continued)

FOREIGN PATENT DOCUMENTS

CN 101883137 A 11/2010
CN 202178848 U 3/2012
(Continued)

OTHER PUBLICATIONS

English language translation of the International Search Report and Written Opinion of the International Searching Authority directed to related international patent application No. PCT/CN2014/094989, dated Apr. 1, 2015; 10 pages.

*Primary Examiner* — Raymond Phan
(74) *Attorney, Agent, or Firm* — Sterne, Kessler, Goldstein & Fox, PLLC

(57) ABSTRACT

Disclosed is system, apparatus and method for centralized management of security inspection devices, which provide connection and communication between local security inspection devices and a remote control site according to bus communication scheme. The system comprises: a plurality of security inspection devices arranged on the spot; a remote control site arranged at a remote side; and a field bus network connecting the plurality of security inspection devices with the remote control site and transmitting signals between the plurality of security inspection devices and the remote control site according to bus communication scheme. With implementations of the present invention, correct and reliable centralized management of local security inspection devices from the remote control site can be achieved with less signal lines and simpler layout of the lines.

14 Claims, 2 Drawing Sheets

(51) Int. Cl.
*G06F 13/364* (2006.01)
*G06F 11/07* (2006.01)
*G05B 15/02* (2006.01)
*G05B 19/042* (2006.01)
*G05B 23/02* (2006.01)

(52) U.S. Cl.
CPC ...... *G05B 23/0267* (2013.01); *G06F 11/0784* (2013.01); *G06F 13/364* (2013.01); *G06F 13/385* (2013.01); *G05B 2219/2642* (2013.01); *G05B 2219/31457* (2013.01)

(56) References Cited

U.S. PATENT DOCUMENTS

| | | | | |
|---|---|---|---|---|
| 7,010,589 | B2* | 3/2006 | Ewing | G06F 1/26 340/693.1 |
| 7,284,078 | B2* | 10/2007 | Fleury | H04L 12/40026 709/201 |
| 7,493,502 | B2* | 2/2009 | Hsieh | G06F 1/3215 713/300 |
| 2002/0095269 | A1 | 7/2002 | Natalini et al. | |
| 2005/0055585 | A1* | 3/2005 | Maier | H04L 12/10 713/300 |
| 2006/0015195 | A1 | 1/2006 | Lehman et al. | |
| 2007/0168467 | A1 | 7/2007 | Hu et al. | |
| 2007/0185588 | A1* | 8/2007 | El-Sayed | G05B 9/03 700/22 |
| 2008/0253514 | A1 | 10/2008 | Panesar et al. | |
| 2008/0294915 | A1* | 11/2008 | Juillerat | G06F 1/266 713/300 |
| 2010/0217406 | A1 | 8/2010 | Berry, Jr. et al. | |
| 2010/0306567 | A1* | 12/2010 | Seiler | G05B 19/4185 713/330 |
| 2011/0208359 | A1 | 8/2011 | Duchene et al. | |

FOREIGN PATENT DOCUMENTS

| | | |
|---|---|---|
| CN | 202205061 U | 4/2012 |
| CN | 103200056 A | 7/2013 |
| CN | 203643824 U | 6/2014 |
| DE | 10 2004 005962 A1 | 8/2005 |
| EP | 2 228 697 A2 | 9/2010 |
| JP | 2009080732 A | 4/2009 |

* cited by examiner

SYSTEM, APPARATUS AND METHOD FOR CENTRALIZED MANAGEMENT OF SECURITY INSPECTION DEVICES VIA FIELD BUS NETWORK

CROSS-REFERENCE TO RELATED APPLICATIONS

This application claims priority to the Chinese Patent Application No. 201310739125.1 filed on Dec. 26, 2013, the entire content of which is incorporated herein by reference in its entirety.

TECHNICAL FIELD

Example embodiments of the present invention generally relate to management of security inspection devices, and in particular, to systems, apparatus and methods for centralized management of security inspection devices.

BACKGROUND

Currently, in scenarios where security inspection devices are utilized, such as airport, stadium and gymnasium, there are usually several security inspection devices arranged on the spot, while a control cabinet is remotely located. According to operation requirements, the security inspection devices, also be referred as local devices, need to be powered on before start of daily work and powered off before end of daily work. Since power switches of these devices are at the local side, the operator of the control cabinet has to move to the site for operations such as power-on/off of the devices, which leads to workload increase of the operator. Furthermore, there exist a variety of additional requirements. For example, it is desirable to perform control operations such as power-on/off of the local devices at the local side, or control operations such as power/off of the local devices at the remote side. It is also desirable to collectively control, power-on/off and batch-select the local devices from the remote side, or remotely perform operations such as emergency stop and status diagnosis between the remote side and the local devices.

Conventionally, in order to satisfy the above discussed requirements, power-on/off control of the local devices may be implemented by converging power-on/off signals from the local devices to the remote control site via several signal lines, and combining power-on/off signals from both the local and remote sides with reference to the power-on/off lights on a panel of the remote control site. If each local device has 4 signal lines for power-on/off, 4*N signal lines are connected to the remote side for N(N≥2) local devices. Furthermore, there are signals, such as failure, status, etc., to be fed back from the local devices to the remote control site. As a result, the number of signal lines becomes very large. In traditional solutions, each signal occupies one signal line, resulting in a large number of signal lines, complicated layout of lines, difficulty in diagnosis when some problem arises, and vulnerability of signals to interference during a long-distance transmission which probably leads to erroneous control status.

There is a need for a method capable of utilizing less signal lines and simpler layout of lines to achieve correct and reliable centralized management of local devices from a remote control site.

SUMMARY

Example embodiments of the present invention provide system, apparatus and method for centralized management of security inspection devices, which provide connection and communication between local security inspection devices and remote control sites according to bus communication scheme.

According to an embodiment of the present invention, a system for centralized management of security inspection devices comprises: a plurality of security inspection devices arranged on the spot; a remote control site arranged at a remote side; and a field bus network comprising a field bus connected to the remote control site, and a plurality of field bus branches connecting from one end of the field bus to the plurality of security inspection devices respectively. The field bus network connects the plurality of security inspection devices to the remote control site, and transmits signals between the plurality of security inspection devices and the remote control site according to bus communication scheme.

According to another embodiment of the present invention, an apparatus for centralized management of security inspection devices is provided. The apparatus is arranged at a remote control site, and comprises: a remote control module connected to a field bus network; and a plurality of operation devices and a plurality of information indication devices connected to the remote control module, and corresponding respectively to a plurality of security inspection devices arranged on the spot. The remote control module generates at least one control signal according to an operation of at least one of the operation devices, and transmits said at least one control signal to the plurality of security inspection devices via the field bus network. The remote control module receives error information, failure information, and/or status information from at least one of the security inspection devices via the field bus network, and displays the received information on at least one of the information indication devices corresponding to the at least one of the security inspection devices.

According to another embodiment of the present invention, a method for centralized management of security inspection devices, comprises: generating a control signal based on an operation at a remote side; transmitting the control signal to a plurality of security inspection devices via a field bus network which connects the plurality of security inspection devices arranged on the spot with the remote side; and identifying the control signal by each of the security inspection devices, and if the control signal is identified as corresponding to the security inspection device, performing a control operation according to the control signal.

In one embodiment, the method further comprise: transmitting error information, failure information, and/or status information from the security inspection devices to the remote side via the field bus network; and receiving and displaying collectively the error information, the failure information, and/or the status information at the remote side.

With various embodiments of the present invention, it is possible to achieve correct and reliable centralized management of local security inspection devices at a remote control site by utilizing less signal lines and simpler layout of lines.

BRIEF DESCRIPTION OF THE DRAWINGS

Implementations of the present invention will be described in further detail below in connection with figures, in which.

DETAILED DESCRIPTION OF THE EMBODIMENTS

Example embodiments of the present invention will be illustrated in detail below in connection with figures. The description below comprises various specific details for assisting understanding, but these specific details should only be interpreted as exemplifying. Therefore, it will be appreciated by those ordinary skilled in the art that various alternations and modifications on respective embodiment depicted herein could be made without departing the scope and spirit of the present disclosure. Additionally, for the sake of clarity, illustration of well-known functionalities and structures will be omitted.

Terms and phrases used in the description below an in claims are not limited to their literal meanings, but only for clear understanding of implementation of the present invention. Therefore, it should be appreciated by those skilled in the art that the following description of respective example embodiments of the present invention is only provided for the purpose of illustration, but not intended to limit the present invention defined by appended claims and equivalents.

Embodiments of the present invention provides system, apparatus and method for centralized management of security inspection devices, which provide connection and communication between local security inspection devices and a remote control site in accordance with bus communication scheme by utilizing a field bus network. Comparing to traditional solutions of using individual signal lines and each signal occupying one signal line, embodiments of the present invention provide advantages, such as reduced number of signal lines, simplified layout of lines, and improved accuracy and reliability of remote control. The embodiments of the present invention will be described below in detail in connection with figures.

Figure 1:
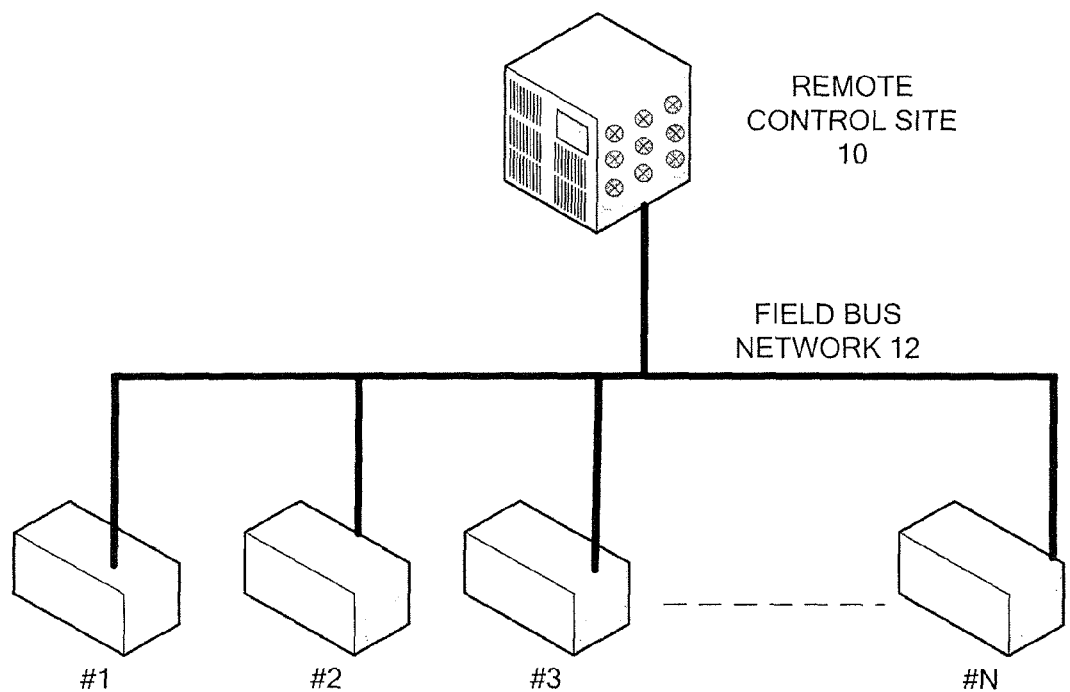
FIG. 1 illustrates a schematic diagram of a system for centralized management of security inspection devices according to an embodiment of the present invention.

FIG. 1 illustrates a schematic diagram of a system for centralized management of security inspection devices according to an embodiment of the present invention. As shown in FIG. 1, the system includes: a plurality of security inspection devices 1 to N (N≥2) arranged on the spot; a remote control site 10 arranged at a remote side; and a field bus network 12. The field bus network 12 includes two parts: a field bus connected to the remote control site, and a plurality of filed bus branches connecting from one end of the field bus to the respective security inspection devices. The field bus network connects the plurality of security inspection devices with the remote control site, and transmits signals between them according to a bus communication scheme.

The remote control site 10 may be implemented in various forms, for example, a general-purpose computer or a dedicated processor. The remote control site 10 may include a field bus communication card to access the remote bus network.

The respective security inspection device 1 to N may each include a field bus communication card to access the remote bus network.

The field bus network may be constructed based on various bus standards, such as CAN, Profibus, foundation field bus or LON bus. The remote control site 10 and the respective security inspection device 1 to N may be configured depending on which bus standard is used, so as to transmit signals between the plurality of security inspection devices 1 to N and the remote control site 10 via the field bus network 12 according to the bus communication scheme.

In one embodiment, the remote control site 10 transmits control signals to the plurality of security inspection devices 1 to N via the field bus network 12. Each of the security inspection devices 1 to N identifies the control signal. If the security inspection device identifies the control signal as corresponding to itself, it will perform a control operation according to the control signal. The control signal may be a power-on/off signal and/or an emergency stop signal.

In one embodiment, each of the security inspection devices 1 to N transmits error information, failure information and/or status information to the remote control site 10 via the filed bus network 12. The remote control site 10 receives the error information, failure information and/or status information, and collectively displays the received information.

In embodiments of the present invention, utilization of a bus architecture leads to a reduced number of signal lines, and simplified layout of lines. For N local security inspection devices, a maximum of N+1 signal lines are required for transmitting all necessary signals and information between the remote side and the local side. Further, by transmitting signals in accordance with bus standards, it is possible to reduce interference during transmission, accurately identify local devices, correctly diagnose the devices and conduct status control to improve control accuracy and reliability.

The remote control site 10 will be described below in detail in connection with FIG. 2.

Figure 2:
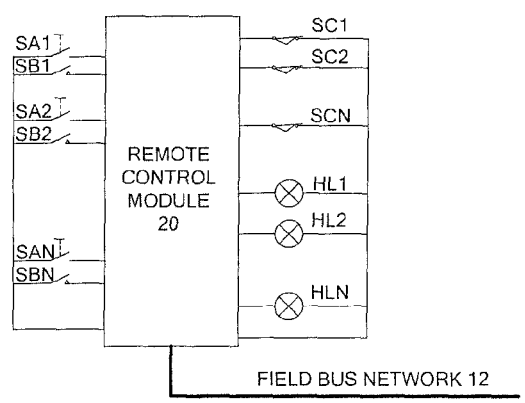
FIG. 2 illustrates a schematic diagram of an apparatus for centralized management of security inspection devices according to an embodiment of the present invention.

FIG. 2 illustrates a schematic diagram of an apparatus for centralized management of security inspection devices according to an embodiment of the present invention. The apparatus may be arranged at the remote control site 10. As shown in FIG. 2, the apparatus may include: a remote control module 20 connected to the field bus network 12; and a plurality of operation devices (SA1~SAN, SB1~SBN, SC1~SCN) and a plurality of information indication devices (HL1~HLN) connected to the remote control module 20 and corresponding to the plurality of security inspection devices 1 to N arranged in the field, respectively.

The remote control module 20 can be implemented in various forms, such as an embedded single board computer, or a micro-computer, an input/output port and a field bus communication card.

The operation devices may include power-on/off devices (SA1~SAN, SB1~SBN) and/or emergency stop devices (SC1~SCN). For example, the operation devices are implemented as joysticks, switches, keys, fuses, and the like. In response to operating at least one of the operation devices, the remote control module 20 may generate at least one control signal based on the operation, and transmits the at least one control signal to the plurality of security inspection devices 1 to N via the field bus network 12. Each of the plurality of security inspection devices 1 to N identifies the control signal, and performs a control operation according to the control signal if it identifies the control signal as corresponding to itself.

The information indication devices may include status indication lights (HL1~HLN), which, for example, may be implemented with LEDs. The remote control module 20 receives the error information, failure information and/or status information from at least one of the security inspection devices 1 to N via the field bus network 12, and displays the received information on at least one of the information indication devices corresponding to the at least one of the security inspection devices.

Although not shown, the information indication devices may include various output devices such as buzzers, display screens and the like to perform information indication in various forms like audio, video, etc.

Figure 3:
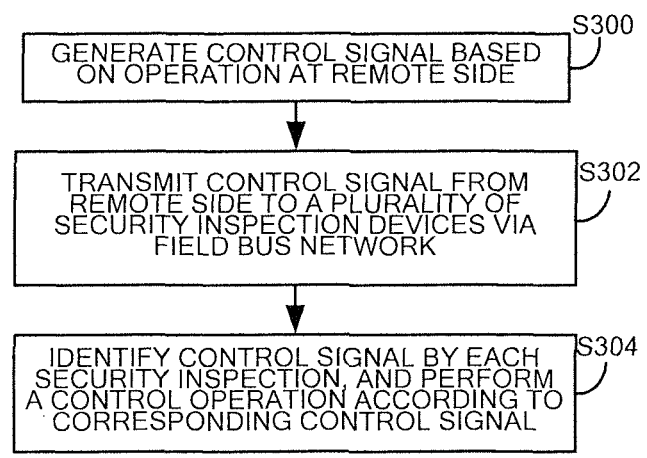
FIG. 3 illustrates a flow chart of a method for centralized management of security inspection devices according to an embodiment of the present invention.

FIG. 3 illustrates a flow chart of a method for centralized management of security inspection devices according to an embodiment of the present invention. The method in FIG. 3 may be applied in the centralized management system shown in FIG. 1.

Although not shown in FIG. 3, the method may include a step of initialization, where a plurality of security inspection devices 1 to N arranged in the field are connected to the remote control site 10 at the remote side via the field bus network.

Signals are then transmitted between the plurality of security inspection devices 1 to N and the remote control site 10 in accordance with the bus communication scheme.

As shown in FIG. 3, in step S300, a control signal is generated according to an operation at the remote side.

In step S302, the control signal is transmitted to the plurality of security inspection devices via the field bus network which connects the plurality of security inspection devices arranged in the field with the remote side.

In step S304, each of the security inspection devices identifies the control signal, and performs a control operation according to the control signal if the security inspection device identifies the control signal as corresponding to itself.

The control signal here may include a power-on/off signal and/or an emergency stop signal.

Although not shown in FIG. 3, the method may further include transmitting error information, failure information and/or status information from the respective security inspection devices to the remote side via the field bus network, and receiving the error information, failure information and/or status information, and collectively displaying the receiving information at the remote side.

The above detailed description has illustrated various embodiments of system, apparatus and method for centralized management of security inspection devices in schematic diagrams, flow charts and/or examples. In cases that these schematic diagrams, flow charts and/or examples includes one or more functionalities and/or operations, it should be appreciated by those skilled in the art that each functionality and/or operation in these schematic diagrams, flow charts and/or examples can be separately and/or collectively achieved by various structures, hardware, software, firmware or substantially any of their combinations. In one embodiment, several components of subject matters of embodiments of the present invention may be implemented by an application specific integrated circuit (ASIC), Field Programmable Gate Array (FPGA), Digital Signal Processor (DSP), or other integrated format. However, it should be appreciated by those skilled in the art that all or part of some aspects of embodiments discloses herein may be equivalently implemented in integrated circuits, implemented as one or more computer programs executed on one or more computers (for example, implemented as one or more programs executed on one or more computer systems), implemented as one or more programs executed on one or more processors (for example, implemented as one or more programs executed on one or more micro-processors), implemented as firmware, or substantially implemented as any combinations of the above described methods, and those skilled in the art will have the ability of designing circuits and/or writing-in software and/or firmware codes based on the present disclosure. Additionally, it will be appreciated by those skilled in the art that subject matters of the present disclosure can be distributed as various types of program products, and example embodiments of the subject matters of the present disclosure will always be applicable regardless of the specific type of signal carrying medium for implementing distribution. Examples of the signal carrying medium include, but is not limited to: recordable medium, such as flexible disks, hard drives, compact disk (CD), Digital Versatile Disk (DVD), digital cassettes, computer memories, etc.; and transmission medium, such as digital and/or analog communications medium, for example, fiber optical cable, waveguide, wired communications link, wireless communications link, etc.

Although the present invention has been described with reference to several typical embodiments, it should be appreciated that terms used herein are illustrative and exemplifying, but not limiting. Since the present invention can be specifically implemented in various ways without departing the spirit and substance of the invention, it should be appreciated that the above described embodiments are not limited to any of above described details, but should be widely explained within the spirit and scope defined by appended claims. Consequently, all of the alternations and modifications falling into the scope of claims or the equivalents thereof are covered by appended claims.

What is claimed is:

1. A system for centralized management of security inspection devices, comprising:
   a plurality of security inspection devices;
   a remote control site, remote from the plurality of security inspection devices, comprising
      a remote control module configured to remotely control the plurality of security inspection devices in a centralized manner, and
      a plurality of operation devices connected to the remote control module and configured to remotely operate the plurality of security inspection devices; and
   a field bus network comprising a field bus connected to the remote control module, and a plurality of field bus branches connecting from one end of the field bus to the plurality of security inspection devices respectively, wherein the field bus network connects the plurality of security inspection devices to the remote control module, and transmits signals between the plurality of security inspection devices and the remote control module according to a bus communication scheme; wherein
   the remote control module generates at least one control signal according to an operation of at least one of the operation devices, and transmits said at least one control signal to the plurality of security inspection devices via the field bus network to thereby control at least one of the plurality of security inspection devices.

2. The system of claim 1, wherein, the field bus network comprises at least one of CAN, Profibus, Foundation Field Bus, and LON bus.

3. The system of claim 1, wherein, the remote control module transmits a control signal to the plurality of security inspection devices via the field bus network, and
   each of the security inspection devices identifies the control signal, and performs a control operation according to the control signal when the control signal is identified as corresponding to the security inspection device.

4. The system of claim 1, wherein, each of the plurality of security inspection devices transmits at least one of error information, failure information, and status information to the remote control module via the field bus network, and the remote control module receives at least one of the error information, failure information, and status information, and displays the received information.

5. The system of claim 1, wherein, a plurality of information indication devices are further provided at the remote control site, connected to the remote control module and controlled by the remote control module to indicate information of the plurality of security inspection devices, respectively.

6. The system of claim 3, wherein, the control signal comprises at least one of a power-on/off signal and an emergency stop signal.

7. The system of claim 5, wherein, the remote control module receives at least one of the error information, failure information, and status information from at least one of the security inspection devices via the field bus network, and controls to display the received information on at least one of the information indication devices corresponding to said at least one of the plurality of security inspection devices.

8. The system of claim 5, wherein, the operation devices comprise at least one of power-on/off devices, and emergency stop devices, and the information indication devices comprise status indication lights.

9. An apparatus for centralized management of security inspection devices, wherein the apparatus is arranged at a control site remote from the security inspection devices, and comprises:

a remote control module connected to a field bus network;

a plurality of operation devices, connected to the remote control module and configured to remotely operate the plurality of security inspection devices; and a plurality of information indication devices connected to the remote control module, and controlled by the remote control module to indicate information of the plurality of security inspection devices, respectively;

wherein, the remote control module generates at least one control signal according to an operation of at least one of the operation devices, and transmits said at least one control signal to the plurality of security inspection devices via the field bus network to control at least one of the plurality of security inspection devices; and the remote control module receives at least one of error information, failure information, and status information from the at least one of the plurality of security inspection devices via the field bus network, and controls to display the received information on at least one of the information indication devices corresponding to said at least one of the plurality of security inspection devices.

10. The apparatus of claim 9, wherein, the plurality of operation devices comprise at least one of power-on/off devices, and emergency stop devices, and the information indication devices comprise status indication lights.

11. The apparatus of claim 9, wherein, the remote control module comprises at least one of an embedded single board computer, a micro-computer, an input/output port, and a field bus communication card.

12. A method for centralized management of security inspection devices, comprising:

generating, at a control site remote from a plurality of security inspection devices, at least one control signal according to an operation of at least one of the operation devices provided at the control site and configured to remotely operate the plurality of security inspection devices, respectively;

transmitting the at least one control signal to the plurality of security inspection devices via a field bus network which connects the plurality of security inspection devices with the control site; and identifying the at least one control signal by each of the plurality of security inspection devices, and in response to the at least one control signal being identified as corresponding to the at least one of the plurality of security inspection devices, performing a control operation according to the at least one control signal.

13. The method of claim 12, wherein, at least one the control signal comprise at least one of power-on/off signal, and emergency stop signal.

14. The method of claim 12, further comprising: transmitting at least one of error information, failure information, and status information from the plurality of security inspection devices to the control site via the field bus network; and receiving and displaying collectively the at least one of error information, failure information, and status information at the control site.

* * * * *